UNITED STATES PATENT OFFICE.

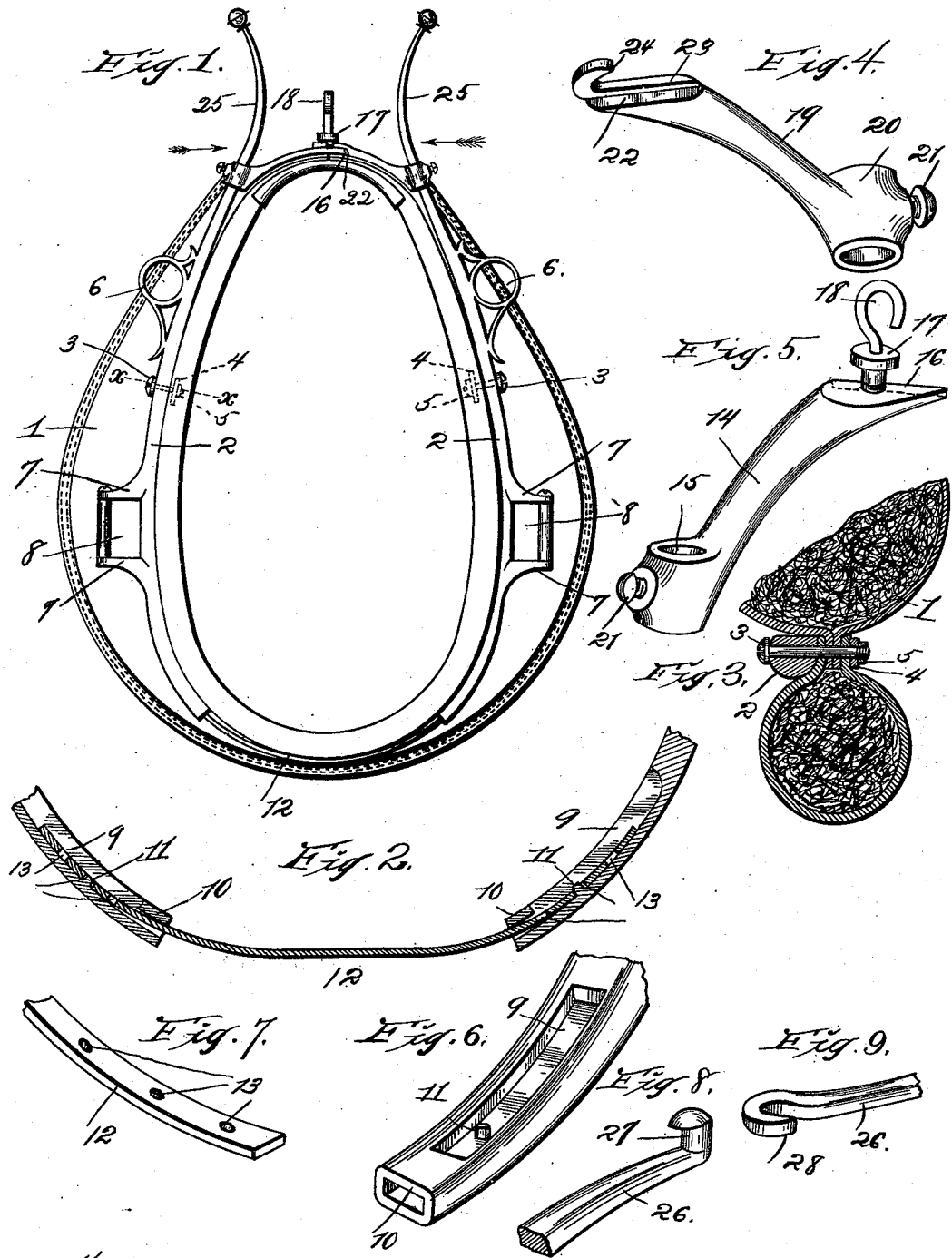

FRANK D. PELLETIER, OF KANSAS CITY, MISSOURI.

COMBINED COLLAR AND HAMES.

SPECIFICATION forming part of Letters Patent No. 523,406, dated July 24, 1894.

Application filed October 17, 1893. Serial No. 488,408. (No model.)

*To all whom it may concern:*

Be it known that I, FRANK D. PELLETIER, of Kansas City, Jackson county, Missouri, have invented certain new and useful Improvements in a Combined Collar and Hames, of which the following is a full, clear, and exact description, reference being had to the accompanying drawings, forming a part hereof.

My invention relates to a combined collar and hames, and the object of my invention is to provide a hames to be permanently bolted or otherwise secured to the collar, and which is adjustable to fit collars of various sizes.

A further object of my invention is to produce a hames which is simple, durable and inexpensive of construction.

With these objects in view, my invention consists in certain peculiar and novel features of construction and combinations of parts, as will be hereinafter described and claimed.

In order that my invention may be fully understood, I will proceed to describe it with reference to the accompanying drawings, in which—

Figure 1, is a front elevation of a horse collar, and showing a hames constructed in accordance with my invention applied thereto. Fig. 2, is a sectional view of the lower end of the hames to disclose the means for lateral adjustment. Fig. 3, is a cross sectional view on the line $x-x$ of Fig. 1, enlarged, to show the manner of permanently connecting the hames to the collar. Figs. 4 and 5, are detail perspective views of the adjustable sections whereby the hame sections are secured together at their upper ends. Fig. 6, is a detail perspective view of the lower end of one of the hame sections, and Fig. 7, is a detail perspective view of a portion of the adjustable spring plate for uniting or connecting the lower end of the hame sections. Figs. 8 and 9, are detail perspective views of a modified form of construction.

In the said drawings, 1 designates a collar of the usual or any preferred construction, and 2—2 designate the opposite sections of the hames; these sections being secured in the usual position relative to the collars, by bolts 3 passing inwardly therethrough, through the narrow portion of the collar, a washer 4, and having their inner threaded ends engaged by retaining nuts 5. The hame sections remain permanently in this position, until the collar is worn out, disposed of, or it is desired to place the hames upon a new or different collar, when the sections may be easily removed by unscrewing the nut 5 from the bolt, and withdrawing the bolts from the collar as will be readily understood.

Each hame section carries a rein-ring 6 of the usual or any preferred construction, and is also formed with a horizontal and outwardly projecting pair of lugs 7—7, which are united by a vertical bolt, and an anti-friction roller upon said bolts, to form a loop to be engaged by the snap hook or ring of the corresponding trace (not shown). The lower portion of each hame section is recessed longitudinally at its inner side at 9 for a suitable distance from its adjacent or lower front end, and the lower or adjacent ends of said recesses are bridged over at 10. Projecting inwardly from the base or bottom of each recess 9, a suitable distance inward of the bridge portion 10, preferably, is the lug or pin 11.

The lower ends of the hame sections are united or connected by a spring plate 12, the opposite ends of which are first inserted below the bridge portions 10 of the opposite sections, and fit snugly in the recesses 9; one or the other of the openings 13 engaging the projections or pins 11 upon the base or bottom of said recesses. From this construction, it is apparent that by engaging different openings 13 with the said projections or pins, the distance between the hame sections may be increased or diminished, so as to accommodate collars of varying widths.

In order to unite or connect the upper ends of the hame sections, I provide a segmental section or plate 14 having a tubular extension 15 which fits and is adapted to slide upon its corresponding hame section, and this section 14 is preferably flattened at its upper and inner end, and formed with a vertical shoulder 16, which extends obliquely to the rear and to the left of an imaginary line centrally dividing the collar. A headed lug 17 forming practically a hook is screwed downward into the said section adjacent to the inclined shoulder 16, or it may be cast integrally therewith if desired, and is provided with a vertical and forwardly disposed hook portion 18 projecting from its upper end. A segmental section 19 is provided with a tubular extension 20 which fits and is adapted to slide upon the companion or opposite hame section, and these sections are adapted to be rigidly secured at any desired point of adjustment upon the hame sections, by means of set screws 21 which pass through said tubular extensions and are adapted to impinge firmly upon their respective hame sections. The front end of the segmental section 19 is preferably thickened, and is formed with an oblique or inclined vertical shoulder 22 which is adapted to fit squarely against the correspondingly inclined shoulder 16, and with the horizontal projecting flange 23, which is adapted to overlap and fit upon the adjacent end of the section 14, and said overlapping flange 23 terminates in a forwardly disposed hook 24 which is adapted to engage the bolt or lug 17 beneath its head, and thus secure or unite the upper ends of the hame sections together.

From the foregoing, it will be seen that the sections 14 and 19 may be adjusted vertically upon the upper portion of the hame sections so as to fit collars of varying heights. When it is desired to remove the collar from the horse, it is only necessary to force the upper ends of the hames toward each other as indicated by the arrows Fig. 1, when by reason of the obliquely arranged shoulders 16 and 22, the sections 14 and 19 will be moved a sufficient distance in opposite directions to disconnect or disengage the hook 24 from the neck of the bolt 17. When it is desired to hook these sections together, the upper portion of the hames is compressed as before until the front portion of the shoulder 22 bears against the middle portion of the shoulder 16, when upon relaxing the pressure, the said shoulders will ride upon each other, and the hook 24 will immediately engage the neck of the bolt 17, as will be readily understood.

The upwardly projecting hook 18 is only necessary, when a back-saddle is not used, to provide a support for the back strap (not shown) to which is attached the breeching.

In Figs. 8 and 9, I show a slight modification of the upper portion of the hames. In this instance, the upwardly projecting ends 25—25 of the hame sections, are dispensed with, and the upper portion of each section is bent to conform to the upper portion of the collar, as shown at 26, and one of these portions terminates in a vertically disposed hook 27, and the corresponding end of the other section or portion terminates in a horizontally disposed hook 28, which is adapted to engage the hook 27, to connect or unite the hame sections at their opposite ends. From this construction, it will be apparent that the hames thus formed at their upper ends, and of spring metal, may be easily connected or disconnected; thus obviating the time and trouble occasioned in using the straps or buckles.

From the above description, it will be seen that I have produced a hames which is permanently carried by the collar and which is adjustable both laterally and vertically to accommodate itself, to collars of various sizes, which is easily adjusted, and which is simple, durable and inexpensive of construction.

Having thus described my invention, what I claim as new, and desire to secure by Letters Patent, is—

1. The combination with a collar, of a hames consisting of a pair of the hame sections or arms permanently secured to the collar, and a pair of sections having tubular extensions fitting and adjustable upon the said arms or sections, an inclined shoulder formed at the inner end of one of said sections having the tubular extensions, and a headed bolt or lug also carried thereby, and a correspondingly inclined shoulder at the adjacent end of the other section having a tubular extension, and a hook portion also projecting from said last mentioned section, and adapted to engage the neck of the headed bolt or lug, substantially as set forth.

2. The combination with a collar, and a hames consisting of two sections or arms secured to the collar, of a section having a tubular extension fitting adjustably upon one of the hame sections or arms, and terminating in a vertical and inclined shoulder, a headed bolt projecting from said section adjacent to said shoulder, and a hook projecting from said bolt, of a second section having a tubular extension fitting adjustably upon the opposite hame section or arm, and having at its inner end a vertical shoulder inclined to correspond with the shoulder of the first named section, a horizontal flange projecting beyond said inclined shoulder and overlapping the adjacent end of the first named section, and a hook at the free end of said horizontal flange adapted to engage the neck of the headed bolt or lug, substantially as set forth.

3. In combination, substantially as hereinbefore set forth, a collar opening at the top, hame sections bolted rigidly and permanently thereto, and detachably secured together at their upper ends, and having at their lower ends and inner sides the recesses 9, and portions 10, bridging the lower termini of said recesses, and a lug 11, projecting from the bottom of said recesses, and a resilient plate having its ends projecting through the bridged portion of said recesses, and having apertures engaged by said lugs 11.

In testimony whereof I affix my signature in presence of two witnesses.

FRANK D. PELLETIER.

Witnesses:
 MAUD FITZPATRICK,
 G. Y. THORPE.